United States Patent [19]
Nguyen

[11] Patent Number: 5,507,373
[45] Date of Patent: Apr. 16, 1996

[54] CLUTCH ACTUATION MECHANISM

[76] Inventor: Phuong H. Nguyen, 14752 Hunter La., Midway, Calif. 92655

[21] Appl. No.: 252,214

[22] Filed: Jun. 1, 1994

[51] Int. Cl.⁶ .................................................. B60K 41/28
[52] U.S. Cl. ..................... 192/3.58; 192/85 C; 192/82 P; 477/74; 60/545
[58] Field of Search .................................. 192/3.58, 3.59, 192/85 C, 85 V, 82 P; 477/74; 60/545

[56] References Cited

U.S. PATENT DOCUMENTS

| | | | |
|---|---|---|---|
| 3,303,912 | 2/1967 | Fujimoto et al. | 192/3.58 X |
| 4,488,625 | 12/1984 | Nobumoto et al. | 192/3.58 |
| 4,505,364 | 3/1985 | Goucher et al. | 192/3.58 X |
| 4,533,030 | 8/1985 | Gabriel | 192/3.58 |
| 5,002,166 | 3/1991 | Leigh-Monstevens et al. | 192/3.58 X |

*Primary Examiner*—Richard M. Lorence
*Attorney, Agent, or Firm*—Dennis W. Beech

[57] ABSTRACT

The clutch actuation system provides for control of the clutch of a manual transmission in a motor vehicle. By use of an electric motor with mechanical linkage, hydraulics, a vacuum booster and a gradual pressure relief valve a smooth easy control of the manual transmission is accomplished. The vacuum booster provides an assist to the hydraulic system when the clutch must be disengaged. The gradual pressure relief valve provides for a smooth transition in the hydraulic system to engage and disengage the clutch. An engine RPM sensor is provided to prevent the disengagement of the transmission by the brake switch except at low engine RPM. The rapid smooth assist is aided by the vacuum system of the motor vehicle. For certain motor vehicles the engine oil system is also used to assist.

6 Claims, 2 Drawing Sheets

CLUTCH ACTUATION MECHANISM

BACKGROUND OF THE INVENTION

1. Field of the Invention

This invention relates to devices used to engage and disengage the clutch of a motor vehicle having a manual gear control system. The new system provides a switch actuated electronic and hydraulic control method for smooth operation of the engagement and disengagement of the clutch. This system replaces the clutch pedal normally operated by a person's foot with a system that may be operated with a person's hand.

2. Description of Related Art

There are currently in use various types of devices and systems for actuating the clutch assembly of a manual transmission motor vehicle. The traditional method uses the clutch pedal mounted near the floor of the driver's side of the passenger compartment. The clutch pedal is linked to the clutch fork in the manual transmission by mechanical linkage. This allows for the driver to use his foot to engage and disengage the clutch assemble. The ease and smoothness with which such control is performed is dependant on the individual driver's ability to perform such a function.

The automatic transmission in a typical motor vehicle removes the gear shifting operation from the concern of the driver. Most automatic transmissions provide an easy, smooth transition between driving gears for the motor vehicle. However, typically the automatic transmissions causes a greater expenditure of fuel than the typical manual transmission due to the engine power use associated with automatic transmissions.

In addition, various clutch control systems have been designed as an assist to the standard clutch pedal mechanisms for a standard transmission. Such systems include electrically controlled hydraulic pump and hydraulic actuators linked to the clutch pedal linkage. Systems which are linked to the gear shift lever of a motor vehicle and utilize hydraulic systems of pumps and actuators also exist in the art. More recently computer controlled semi-automatic gearshift systems have been introduced by several European automobile manufacturers.

The present invention combines the use of a simple switch controlled electronic actuating mechanism combined with a hydraulic system and the vacuum system of the motor vehicle to provide for easy, smooth manual transmission clutch operation. By means of a gradual pressure release valve and other electronic and hydraulic design a smooth engagement of the clutch assembly is achieved.

SUMMARY OF THE INVENTION

A primary objective of the present invention is to provide a switch controlled, electronic and hydraulic actuated system for engaging and disengaging the clutch of a manual transmission used with motor vehicles. An additional objective is to utilize the motor vehicle vacuum system to provide such clutch operation in a smooth, efficient manner. A further object is to use the engine oil system of the motor vehicle to assist the clutch operation in those vehicles which do not have a sufficient vacuum system for assisted operation.

In accordance with the description presented herein, other objects of this invention will become apparent when the description and drawings are reviewed.

DESCRIPTION OF THE PREFERRED EMBODIMENT

Figure 1:
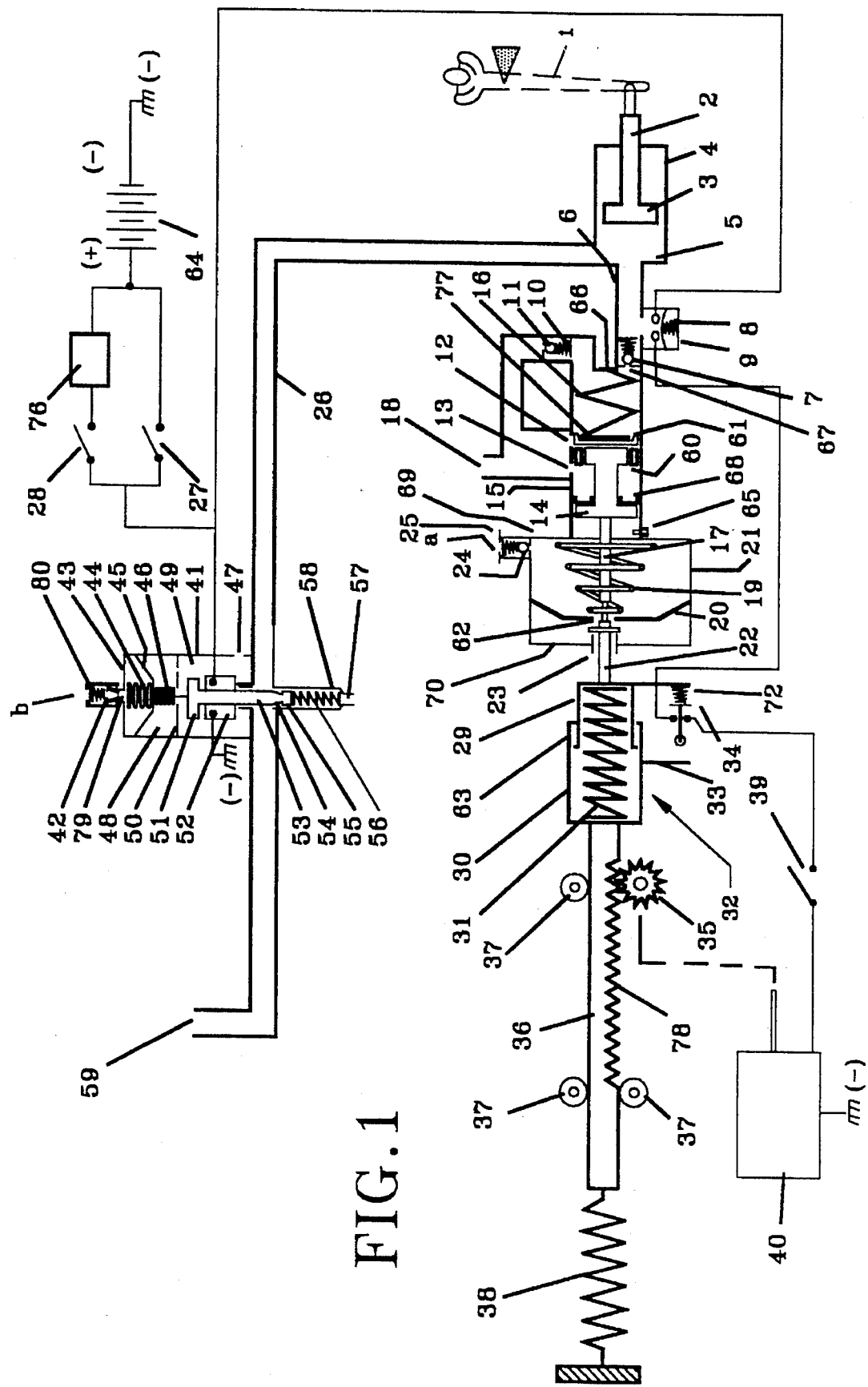
FIG. 1 is a schematic of the clutch actuation system.
Figure 5:
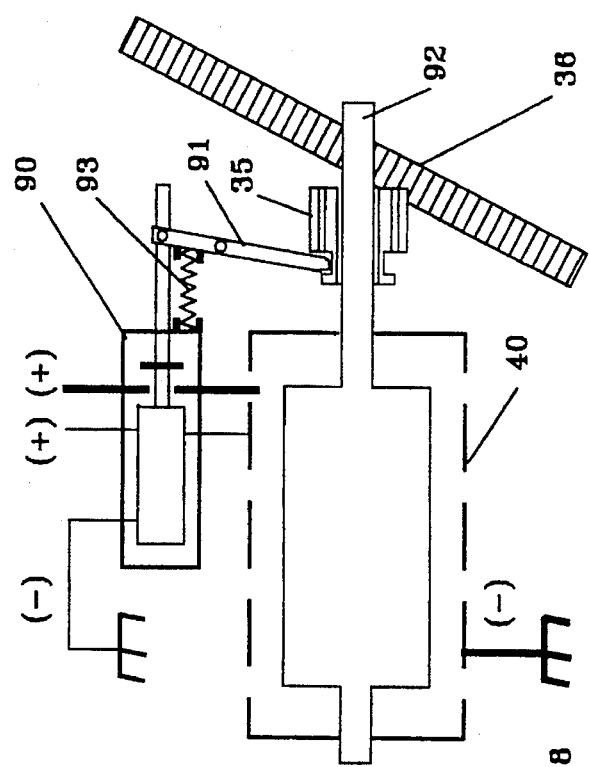
FIG. 5 illustrates a typical automobile starter motor schema.
Figure 3:
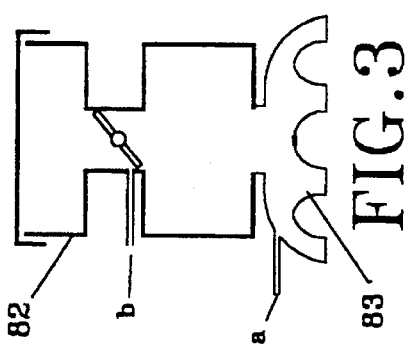
FIG. 3 illustrates a schema of the vacuum source for the clutch actuation mechanism.
Figure 4:
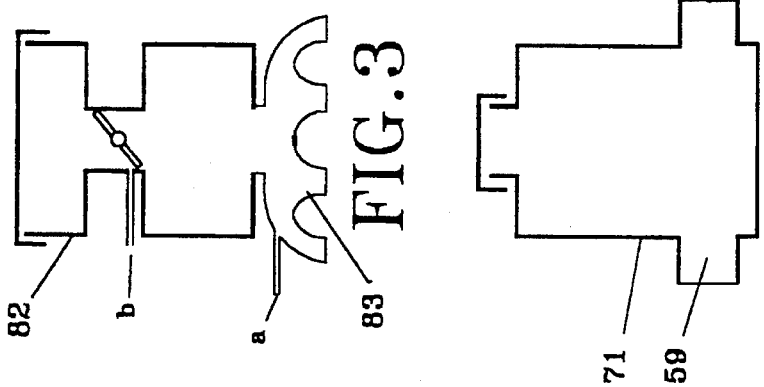
FIG. 4 illustrates a fluid reservoir schema for the clutch activation system.

The clutch actuation mechanism consists of a control system with driver unit, electric motor, valves, cylinder actuator and vacuum booster attached to the clutch fork of a clutch assembly in a motor vehicle having a manual transmission. The systems uses a gradual pressure relief valve similar to that claimed in U.S. patent application Ser. No. 08/189,717 filed Feb. 01, 1994. Various elements of the hydraulic control system are connected to the motor vehicle engine vacuum system to assist the operation of the hydraulic system to provide a smooth transition in engaging the clutch assembly. The clutch actuation system is switch controlled electrically to allow for clutch operation by use of a person's hand or foot.

Referring to FIG. 1 through FIG. 5, the clutch fork (1) is connected to the clutch fork rod (2) which is linked to the slave piston (3) in the slave cylinder (4). The slave cylinder (4) is connected at a hydraulic end (5) to a hydraulic control system. The pressure side of the hydraulic control system has a pressure line (6) connected to a master cylinder (15) and to the slave cylinder (4).

The hydraulic control system is actuated by a combination vacuum booster (21) and an electric motor (40) driving the drive bar (36) system. The electric motor (40) has an electric solenoid (90) actuated plunge driver gear (35) which engages drive bar teeth (78), much as an automobile starter motor solenoid (90) moves a shift fork (91) to move the plunge driver gear (35) on spline shaft (92) to engage a flywheel ring gear, shown as the drive bar (36) in FIG. 5, to apply a force against the outer shell (30) of the safe device (32). The drive bar (36) moves longitudinally between bushing bearings (37) when it is driven by the plunge driver gear (35). There is a return spring (38) attached to the drive bar (36) to retract the drive bar (36) when the plunge driver (35) is disengaged, as in an automobile starter motor when electric power is interrupted the shift fork (91) retracts the plunge driver gear (35) by action of shift fork spring (93).

The safe device (32) has an outer shell (30) and inner shell (29) which are basically cylindrical cups with cooperatively mounted retaining flanges (63) to retain the shells when the safe device (32) is fully extended. There is a safe linkage spring (31) mounted in the safe device (32). When the drive bar (36) applies force against the outer shell (30) it in turn forces the safe linkage spring (31) which applies force against the inner shell (29). The inner shell (29) is attached to valve rod (22). The safe linkage spring (31) is sufficiently rigid not to be compressed by the force of the drive bar (36) against the safe device (32) translated to force the movement of the valve rod (22).

The safe device (32) has a safe switch (34) which switch disconnects electric power to the electric motor (40) when the outer shell (30) reaches its limit of travel and the outer shell arm (33) contacts the safe switch (34). This occurs when the limit switch (9) fails to disconnect the electric motor (40) once proper pressure has been reached to disengage the clutch of the vehicle. The drive bar (36) will continue to apply force against outer shell (30) to the point the safe linkage spring (31) is compressed to the point the outer shell arm (33) contacts the safe switch (34). This prevents the drive bar (36) from forcing the safe device (32) beyond a determined length of travel.

The safe device (32) is intermediate the vacuum booster (21) and drive bar (36) providing protection to the system should the limit switch (9) fail to operate. In an emergency case of a heavy load build up, the drive bar (36) presses the safe linkage spring (31) until the outer shell arm (33) of outer shell (30) contacts the safe switch (34) attached on the inner shell arm (72). After the disconnecting of the current at safe switch (34), if the limit switch (9) still fails to disconnecting the current in spite of the increasing fluid pressure, the pulling force of return spring (38) and the expanding of safe linkage spring (31) reconnect the current to electric motor (40) at safe switch (34). If this series of actions is repeated a number of times, the bi-metallic thermostatic overload switch (39) temporarily cuts off the current to protect the electric motor (40).

The safe device (32) forces longitudinal movement of the valve rod (22) of the vacuum booster (21). The vacuum booster (21) transmits and boosts the force from the drive bar (36) and safe device (32) to the master piston (14). The valve rod (22) in the vacuum booster (21) is linked to the push rod (17) which extends through the vacuum booster (21) to the master piston (14) in the master cylinder (15). The vacuum booster (21) has a booster diaphragm (20) therein intermediate a valve rod side (70) and push rod side (69) through which the push rod (17) extends. The booster diaphragm (20) has a vacuum passage (62) which may be opened and closed by the push rod (17) and valve rod (22).

The vacuum booster (21) also has an assist vacuum port (25) with a check valve (24) connected to the engine intake manifold (83) which is a relatively strong vacuum source. Assist vacuum port (25) creates a strong vacuum in the vacuum booster (21) when the clutch is engaged and the push rod (17) is retracted into the vacuum booster (21) closing the atmospheric port (23). The vacuum created through assist vacuum port (25) exists on the push rod side (69) and valve rod side (70) through vacuum passage (62).

When the valve rod (22) is forced toward the push rod side (69) the valve rod (22) closes the vacuum passage (62) and opens the atmosphere port (23) thus allowing atmospheric pressure into the valve rod side (70) of the vacuum booster (21). This pressure differential helps push the clutch fork (1) to disengage the clutch by applying force to the push rod (17) via the booster diaphragm (20) much as a power brake assist unit on an automobile brake system operates.

At the same time the electric motor (40) activates the plunge driver gear (35), the gradual pressure relief valve (41) is closed in the relief line (26) by the solenoid (52). While the drive bar (36) is pushing the safe device (32) the master piston (14) moves toward the master cylinder end (66) and closes the compensating port (12) increasing the hydraulic pressure through main check valve (7) and pushes the slave piston (3) linked to clutch fork (1) to disengage the clutch of the motor vehicle. Once the master piston (14) has moved toward the master cylinder end (66) sufficiently to disengage the clutch, the continued pressure increase due to the drive bar (36) force against the safe device (32) is discontinued by limit switch (9). With electric power disconnected, the plunge driver gear (35) disengages from the driver bar (36) much as an electric starter motor on automobiles. The force of return spring (38) with the force of vacuum booster spring (19) and master cylinder spring (16) causes the master piston (14) to move back to its original position at the piston stop bolt (65).

Once proper pressure is established to maintain the clutch fork (1) in the fully disengaged position, the limit switch (9) is opened to disconnect the electric source (64) from the electric motor (40). Should there be any leakage such that the pressure against piston (3) decreases, the limit switch (9) will close by action of limit switch spring (8) to supply power to motor (40). A pressure check valve (7) in pressure line (6) prevents back flow of hydraulic fluid when the driver bar (36) is not activated.

The electric motor (40) and solenoid (52) are powered by the electric source (64) when either the brake pedal switch (28) or the gear shift handle switch (27) are closed in the electrical circuit. When the limit switch (9) opens to disconnect electric power to motor (40), the clutch will stay disengaged as long as solenoid (52) is activated.

The clutch activation system allows the clutch to engage when the brake pedal switch (28) and gear shift handle switch (27) are open. This normally occurs when the driver releases the brake and/or the gear shift handle switch (27). In this open position the electric source (64) is disconnected from the motor (40) and the solenoid (52).

Figure 2:
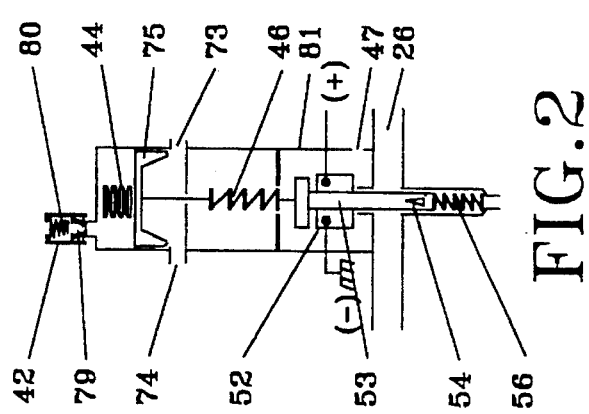
FIG. 2 is a schematic of the gradual pressure relief valve using the engine oil system.

The gradual pressure relief valve (41) has a relief piston (53) extending from the lower valve chamber (49) through the relief line (26). The relief piston (53) passes through the solenoid (52). The relief piston (53) has a tapered section (54) intermediate the limit end (51) and the flow end (55) which tapered section (54) is the length of the diameter of the relief line (26). The tapered section (54) may be circumferential to the relief piston (53) as shown in FIG. 1 or internal to the relief piston (53) as shown in FIG. 2.

The gradual pressure relief valve (41) has a lower valve chamber (49) and upper valve chamber (48). The upper valve chamber (48) has a chamber diaphragm (45) intermediate the chamber separator (50) and the upper valve chamber end (43). The relief piston (53) limit end (51) is connected to the chamber diaphragm (45) by a flexible linkage spring (46). There is a relief spring (44) between the chamber diaphragm (45) and the upper valve chamber end (43) to create a force to generally separate the chamber diaphragm (45) and the upper valve chamber end (43).

The upper valve chamber end (43) also has a chamber vacuum port (42) connected to the motor vehicle vacuum system such as near the engine air filter (82) to create a weak vacuum relative to ambient pressure in the remainder of the upper valve chamber end (43). This pressure differential tends to open the gradual pressure relief valve (41) by the chamber diaphragm (45) pulling on the relief piston (53) connected by flexible linkage spring (46). The flexible linkage spring (46) is sufficiently rigid to allow chamber diaphragm (45) to pull the relief piston (53) to open the gradual pressure relief valve (41). However, the flexible linkage spring (46) is flexible enough to be expanded due to the force of the solenoid (52) pulling the relief piston (53) to close the gradual pressure relief valve (41).

In the closed position the relief piston (53) limit end (51) is pulled against the solenoid (52). At engine idle speeds the gradual pressure relief valve (41) is closed whether or not the solenoid (52) is activated. At engine idle speeds a weak vacuum is created in the upper valve chamber end (43) which allows idle spring (44) to push the chamber diaphragm (45) away from the upper valve chamber end (43). This in turn pushes linkage spring (46) against the relief piston (53) which closes the relief line (26).

The vacuum port (42) has a leaking check valve (79) and leaking check valve spring (80). The leaking check valve (79) has a small aperture which allows atmospheric pressure to leak slowly into the upper chamber end (43) when no vacuum is present at the vacuum port (42) at engine idle speeds and thus allows chamber diaphragm (45) to move away from the upper diaphragm end (43) by the action of idle spring (44). When the engine is accelerated creating a vacuum at the vacuum port (42), the leaking check valve (79) opens against leaking check valve spring (80) thus allowing a rapid escape of pressure from the upper chamber end (43) and movement of chamber diaphragm (45) toward the upper chamber end (43).

If engine rpm is increased, the vacuum increases in the upper valve chamber end (43). If the solenoid (52) is deactivated, the increased vacuum allows the atmospheric pressure via atmospheric aperture (47) to push the chamber diaphragm (45) toward the upper valve chamber end (43) against relief spring (44) which in turn draws the linkage spring (46) and relief piston (53) toward the upper valve chamber end (43). This moves the relief piston (53) into the open position and allows hydraulic fluid to flow in the relief line (26). This all occurs when switches (27) and (28) are open and the driver accelerates the engine. This increases the vacuum and the springs (44) and (46) provide for a gradual smooth engagement of the clutch. The chamber separator (50) limits the movement of the relief piston (53) when the limit end (51) contacts the chamber separator (50).

At high engine rpm the vacuum in upper valve chamber end (43) is increased which allows atmospheric pressure via atmospheric aperture (47) to push the chamber diaphragm (45) toward the upper valve chamber end (43) against relief spring (44). However, if solenoid (52) is activated, the flexible linkage spring (46) allows the solenoid (52) to hold the relief piston (53) in the closed position and keep the clutch disengaged.

During the condition of the vehicle traveling at speed in gear the disengagement of the clutch is caused when the brake pedal switch (28) or gear shift handle switch (27) are closed by action of the driver. The solenoid (52) is activated and the relief piston (53) is pulled away from the chamber separator (50). This will occur even if the chamber diaphragm (45) is at its closest point to the upper valve chamber end (43) as linkage spring (46) allows the relief piston (53) to move. The solenoid (52) causes the relief piston (53) to move to close the relief line (26). Hydraulic pressure increases as the electric motor (40) is activated to drive the driver bar (36) which pushes master piston (14) to increase hydraulic pressure against slave piston (3) and the clutch is disengaged as described before.

The relief piston (53) flow end (55) is mounted in the open chamber (58) containing open spring (56) to cushion the impact of the limit end (51) contact with solenoid (52) as the relief piston (53) is moved. The open chamber (58) has an open atmospheric port (57) to prevent pressure build up as the relief piston (53) is moved.

The master cylinder (15) has four ports (12, 13, 10, 67). When not engaged, piston (14) rests against stop bolt (65) due to the force of spring (16). With compensating port (12) just ahead and inlet port (13) just behind the piston front face (77), when pushed forward by push rod (17) the piston cup seal (61) covers the compensating port (12) and applies fluid pressure against slave piston (3) through outlet port (67) to disengage the clutch of the vehicle. The inlet port (13) allows fluid behind the piston front face (77) between seals (68) and (61). When piston (14) is retracted by spring (16), fluid is drawn into cylinder (15) through extra inlet port (10) and through check valve (11). The rapid retraction of piston (14) also draws fluid from behind the piston front face (77) through master piston holes (60) into master cylinder (15) much as a brake master cylinder piston on an automobile. Ports (18) and (59) are connected to the hydraulic fluid reservoir (71).

As shown in FIG. 1, the brake pedal switch (28), hydraulic controlled, is installed in the brake hydraulic system of the vehicle so that brake pedal switch (28) is activated only by the fluid pressure of the vehicle brake system.

The RPM sensor switch (76) is controlled by the engine oil pressure, engine vacuum, a magnetic signal or an electric signal. The engine sensor switch (76) connects the circuit from battery (64) to brake switch (28) only at or below a preadjusted idle RPM of the engine. So the circuit closure through switch (28) occurs only at a nearly stopped state of the vehicle. This eliminates the overactive action of brake switch (28).

Referring to FIG. 2, a gradual pressure relief valve (41) uses the engine oil system for assist rather than the engine vacuum system. On some automobile engines the vacuum system is too weak to provide the necessary pressure differential. In this embodiment the engine oil pressure is applied at inlet oil port (73) and released at outlet oil port (74). The engine oil fluid applies pressure against diaphragm piston (75) which tends to push the diaphragm piston (75) toward the upper valve chamber end (43). As described earlier with chamber vacuum port (42) the variation in vacuum created by the engine rpm allows the diaphragm piston (75) to move to assist in movement of relief piston (53).

I claim:

1. A control system for controlling a clutch of a motor vehicle having a manually operated transmission and further having an electric power source, comprising:

a slave cylinder having a slave piston attached to a clutch fork rod which is attached to a clutch fork of the transmission;

a hydraulic master cylinder hydraulically linked to the slave cylinder wherein the master cylinder having a master piston with a master cylinder spring and the master piston abutting to a push rod;

a vacuum booster having the push rod attached to a valve rod wherein the push rod passes through the vacuum booster at a push rod side through a booster diaphragm intermediate the push rod side and the valve rod side wherein the booster diaphragm has a vacuum passage therein;

a diaphragm return spring between the push rod side and the booster diaphragm;

a vacuum port having a vacuum check valve on the push rod side connected to a vacuum source;

an atmospheric port operated by movement of the valve rod on the valve rod side;

a safe device having an outer shell and an inner shell cooperatively interconnected by a retaining flange and having a safe linkage spring contained therein with the valve rod connected to the inner shell;

a safe switch attached to an inner shell arm and an outer shell arm attached to the outer shell;

a drive bar connected to the outer shell and a return spring connected to the drive bar wherein the drive bar is supported by a plurality of bushing bearings;

a plunge driver gear slidably mounted on a spline shaft of an electric motor which electric motor having a starter motor solenoid activation means and the plunge driver gear when moved longitudinally on the spline shaft engages a plurality of drive bar teeth on the drive bar;

a limit switch with a limit switch spring in a pressure line between the master cylinder and the slave cylinder;

a relief line and the master cylinder connected to a fluid reservoir with the relief line having a gradual pressure relief valve intermediate the fluid reservoir and the slave cylinder;

an electric source electrically connected to a brake pedal switch and a gear shift handle switch in parallel which are connected in parallel to a solenoid and a limit switch in the pressure line which limit switch is electrically connected to the electric motor via the safe switch and an overload switch.

2. The control system as in claim 1 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a chamber diaphragm in an upper valve chamber;

the chamber diaphragm attached to a relief spring which is attached to an upper valve chamber end;

the upper valve chamber end having a chamber vacuum port defined therein which has a leaking check valve and leaking check valve spring and the chamber vacuum port attached to the vacuum source;

the relief piston having a tapered section intermediate the limit end and the flow end; and the open chamber having an open spring and an open atmospheric port.

3. The control system as in claim 1 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a diaphragm piston in an upper valve chamber having an inlet oil port and an outlet oil port;

the chamber diaphragm piston attached to a relief spring which is attached to an upper valve chamber end;

the upper valve chamber end having a chamber vacuum port defined therein which has a leaking check valve and leaking check valve spring and the chamber vacuum port attached to the vacuum source;

the relief piston having a tapered section intermediate the limit end and the flow end; and the open chamber having an open spring and an open atmospheric port.

4. A control system for controlling a clutch of a motor vehicle having a manually operated transmission and further having an electric power source, comprising:

a slave cylinder having a slave piston attached to a clutch fork rod which is attached to a clutch fork of the transmission;

a hydraulic master cylinder hydraulically linked to the slave cylinder wherein the master cylinder having a master piston with a master cylinder spring and the master piston abutting to a push rod;

a vacuum booster means having the push rod attached to a valve rod;

a safe device having an outer shell and an inner shell cooperatively interconnected by a retaining flange and having a safe linkage spring contained therein with the valve rod connected to the inner shell;

a safe switch attached to an inner shell arm and an outer shell arm attached to the outer shell;

a drive bar connected to the outer shell and a return spring connected to the drive bar wherein the drive bar is supported by a plurality of bushing bearings;

a plunge driver gear slidably mounted on a spline shaft of an electric motor which electric motor having a starter motor solenoid activation means and the plunge driver gear when moved longitudinally on the spline shaft engages a plurality of drive bar teeth on the drive bar;

a limit switch with a limit switch spring in a pressure line between the master cylinder and the slave cylinder;

a relief line and the master cylinder connected to a fluid reservoir with the relief line having a gradual pressure relief valve intermediate the fluid reservoir and the slave cylinder;

an electric source electrically connected to a brake pedal switch and a gear shift handle switch in parallel which are connected in parallel to a solenoid and a limit switch in the pressure line which limit switch is electrically connected to the electric motor via the safe switch and an overload switch.

5. The control system as in claim 4 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a chamber diaphragm in an upper valve chamber;

the chamber diaphragm attached to a relief spring which is attached to an upper valve chamber end;

the upper valve chamber end having a chamber vacuum port defined therein which has a leaking check valve and leaking check valve spring and the chamber vacuum port attached to a vacuum source;

the relief piston having a tapered section intermediate the limit end and the flow end; and the open chamber having an open spring and an open atmospheric port.

6. The control system as in claim 4 wherein the gradual pressure relief valve comprises:

a relief piston in a lower valve chamber having an atmospheric aperture therein passing through a solenoid with a limit end and with a flow end in an open chamber;

the limit end attached to a linkage spring passing through a chamber separator and attached to a diaphragm piston in an upper valve chamber having an inlet oil port and an outlet oil port;

the chamber diaphragm attached to a relief spring which is attached to an upper valve chamber end;

the upper valve chamber end having a chamber vacuum port defined therein which has a leaking check valve and leaking check valve spring and the chamber vacuum port attached to a vacuum source;

the relief piston having a tapered section intermediate the limit end and the flow end; and the open chamber having an open spring and an open atmospheric port.

* * * * *